(12) United States Patent
Campbell

(10) Patent No.: US 12,568,872 B2
(45) Date of Patent: Mar. 10, 2026

(54) SYSTEMS AND METHODS FOR EQUIPMENT CONTROL USING LARGE LANGUAGE MODEL-BASED ARTIFICIAL INTELLIGENCE

(71) Applicant: CNH Industrial America LLC, New Holland, PA (US)

(72) Inventor: Hatuey Dwaune Campbell, North Aurora, IL (US)

(73) Assignee: CNH Industrial America LLC, New Holland, PA (US)

( * ) Notice: Subject to any disclaimer, the term of this patent is extended or adjusted under 35 U.S.C. 154(b) by 127 days.

(21) Appl. No.: 18/521,528

(22) Filed: Nov. 28, 2023

(65) Prior Publication Data

US 2025/0169391 A1 May 29, 2025

(51) Int. Cl.
*G05B 13/00* (2006.01)
*A01B 69/04* (2006.01)
*A01B 76/00* (2006.01)
*G05B 13/02* (2006.01)

(52) U.S. Cl.
CPC ............ *A01B 76/00* (2013.01); *A01B 69/008* (2013.01); *G05B 13/027* (2013.01)

(58) Field of Classification Search
None
See application file for complete search history.

(56) References Cited

U.S. PATENT DOCUMENTS

| | | | |
|---|---|---|---|
| 2023/0031013 A1 | 2/2023 | Faust et al. | |
| 2023/0222388 A1 | 7/2023 | Cella et al. | |
| 2024/0356870 A1* | 10/2024 | Bouguerra | ............ H04L 51/214 |
| 2024/0370595 A1* | 11/2024 | Vierra | ..................... G06F 30/27 |
| 2025/0077487 A1* | 3/2025 | Groenewegen | ....... G06F 16/215 |
| 2025/0077563 A1* | 3/2025 | Man | ...................... G06F 16/345 |
| 2025/0111321 A1* | 4/2025 | Szmigielski | .......... G06Q 40/03 |
| 2025/0139581 A1* | 5/2025 | Altakrouri | ............. G06Q 50/08 |

FOREIGN PATENT DOCUMENTS

| | | | | |
|---|---|---|---|---|
| CN | 117033557 A | * 11/2023 | ......... G06F 16/3344 |
| CN | 117087687 A | * 11/2023 | ............ B60W 50/08 |
| CN | 117235320 A | * 12/2023 | |
| CN | 117290484 A | * 12/2023 | ......... G06F 16/3329 |
| CN | 117522372 A | * 2/2024 | ............ G06Q 10/20 |
| CN | 117609391 A | * 2/2024 | ........... G06F 16/288 |

(Continued)

*Primary Examiner* — Shelley Chen
(74) *Attorney, Agent, or Firm* — Fletcher Yoder, P.C.

(57) ABSTRACT

An agricultural vehicle includes an operator interface configured to receive inputs, one or more vehicle systems, wherein each of the one or more vehicle systems is configured to control one or more functions of the agricultural vehicle, and an electronic control unit (ECU) communicatively coupled to the operator interface and the one or more vehicle systems. The ECU includes processing circuitry and a memory, accessible by the processing circuitry. The memory stores a large language model (LLM) and instructions that, when executed by the processing circuitry, causes the processing circuitry to receive the inputs from the operator interface, provide the inputs to the LLM, receive, from the LLM, an indication that the inputs meet a set of criteria, and transmit one or more commands to the one or more vehicle systems to implement the inputs.

20 Claims, 8 Drawing Sheets

(56) References Cited

FOREIGN PATENT DOCUMENTS

| | | | | | |
|---|---|---|---|---|---|
| CN | 117290484 | B | * | 6/2024 | ............. G06Q 10/20 |
| CN | 117522372 | B | * | 7/2024 | ............... G06N 5/02 |
| DE | 102021132399 | A1 | | 6/2023 | |
| DE | 102023119574 | A1 | * | 1/2025 | ............. G10L 25/54 |
| WO | 2022167302 | A1 | | 8/2022 | |

* cited by examiner

OPERATOR INTERFACE 20
DISPLAY 232
MICROPHONE 236
SPEAKER 238
234
P 240 M 242 C 244

ELECTRONIC CONTROL UNIT (ECU) 210
P 240 M 242

THROTTLE SYSTEM 212
BRAKING SYSTEM 214
TRANSMISSION SYSTEM 216
CLUTCH SYSTEM 218
HYDRAULIC SYSTEM 220
PTO SYSTEM 222
HITCH SYSTEM 224
GAUGES/INDICATORS 226
LIGHTS/WIPERS 228
CAB CLIMATE CONTROL 230

10

250

246

200

202

14

206
208

S
A

248

SYSTEMS AND METHODS FOR EQUIPMENT CONTROL USING LARGE LANGUAGE MODEL-BASED ARTIFICIAL INTELLIGENCE

BACKGROUND

The present disclosure generally relates to work vehicles and, more specifically, to making control of work vehicles less burdensome for operators.

Work vehicles, such as tractors, as well as other agricultural vehicles (e.g., combines, harvesters, balers, etc.), construction equipment (e.g., excavators, backhoes, skid steers, etc.) and other equipment, may be controlled by one or more operators in performance of a task. Given the seasonal and weather-dependent nature of many such tasks, operators may be tasked with operating equipment for many hours during a given day. Operating equipment may be physically and mentally taxing, resulting in operator fatigue during long shifts. Accordingly, improved equipment control systems are needed that reduce strain on operators during long shifts.

This section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, an agricultural vehicle includes an operator interface configured to receive inputs, one or more vehicle systems, each configured to control one or more functions of the agricultural vehicle, and an electronic control unit (ECU) communicatively coupled to the operator interface and the one or more vehicle systems. The ECU includes processing circuitry and a memory, accessible by the processing circuitry. The memory stores a large language model (LLM) and instructions that, when executed by the processing circuitry, causes the processing circuitry to receive the inputs from the operator interface, provide the inputs to the LLM, receive, from the LLM, an indication that the inputs meet a set of criteria, and transmit one or more commands to the one or more vehicle systems to implement the inputs.

In another embodiment, an electronic control unit (ECU) for a work vehicle is configured to be communicatively coupled to an operator interface of the work vehicle and to one or more vehicle systems of the work vehicle. The ECU includes processing circuitry and a memory, accessible by the processing circuitry. The memory stores a large language model (LLM) and instructions that, when executed by the processing circuitry, causes the processing circuitry to receive data from the one or more vehicle systems during operation of the work vehicle, provide the received data to the LLM, receive, from the LLM, one or more suggested modifications to the operation of the work vehicle, transmit, to the operator interface, the one or more suggested modifications to the operation of the work vehicle, receive, from the operator interface, approval of the one or more suggested modifications to the operation of the work vehicle, and transmit one or more commands to the one or more vehicle systems to implement the one or more suggested modifications to the operation of the work vehicle.

In a further embodiment, a method includes training a large language model (LLM) based on one or more predictive models (e.g., data driven vehicle failure mode models), one or more vehicle manuals, and one or more vehicle function models, and providing the LLM for installation in an ECU of the piece of equipment. The trained large language model is configured to receive inputs from an operator interface, analyze the inputs to determine whether the inputs meet a set of criteria, and output an indication that the inputs meet the set of criteria. The ECU is configured to generate and transmit one or more commands to one or more systems of the piece of equipment to implement the inputs in response to the LLM outputting the indication that the inputs meet the set of criteria.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Figure 1:
FIG. 1 is a perspective view of an embodiment of a work vehicle, in accordance with embodiments presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The present disclosure is directed to a large language model (LLM)-based artificial intelligence (AI) system for use in a work vehicle, such as a tractor. The vehicle may include an operator interface, one or more vehicle systems (e.g., a throttle system, a braking system, a transmission system, a clutch system, a steering system, a hydraulics system, a power take off (PTO) system, a hitch system, gauges/indicators, lights/wipers, cab climate control, etc.), and an electronic control unit (ECU). The ECU may include processing circuitry and a memory. The memory may store an LLM and program instructions executable by the processing circuitry to perform various functions. For example, the ECU may be configured to receive inputs (e.g., voice commands, inputs via a touchscreen, buttons, keyboard, gesture commands, etc.) from an operator interface, analyze the inputs using the LLM, confirm that the inputs meet a set of criteria, and then transmit commands to the one or more vehicle systems to implement the inputs. In some embodiments the vehicle may include a CAN bus network or a LIN bus network that communicatively coupled the ECU and the various vehicle systems and by which commands and data may be transmitted. In some embodiments, the LLM may suggest one or more modifications to the inputs, which may be presented to the operator for approval. The ECU may also be configured to collect data from one or more of the vehicle systems during operation, analyze the data via the LLM, generate one or more suggested modifications to the operation of the work vehicle, transmit the one or more modifications for presentation via the operator interface, receive approval of the one or more modifications, and transmit commands to one or more of the vehicle systems implementing the one or more suggested modifications. The LLM may be trained on various data, such as predictive models (e.g., data driven vehicle failure mode models), vehicle manuals, vehicle function models, and the like. Accordingly, the LLM may be configured to receive requests for portions of one or more manuals, summaries of error codes, and the like, retrieve the data, and provide it to the operator via the operator interface. The LLM may be trained by a third party, such as a manufacturer of the vehicle, a manufacturer of an implement or tool, a distributor of the vehicle, a service provider, and the like, and installed on the ECU for use by the operator. If the third party wishes to update the LLM, the third party may provide updates via a dealer (e.g., when the vehicle is in for service), via a tethered mobile device, via a docking station, via the internet or a connected cloud, via cellular network, via internet connection, via satellite connection, and so forth. Additional details with regard to the LLM-based AI system for use in a work vehicle in accordance with the techniques described above will be provided below with reference to FIGS. 1-12.

FIG. 1 is a perspective view of an embodiment of a work vehicle 10 (e.g., a tractor). The vehicle 10 may provide power to wheels 12 to propel the vehicle 10 down a road or through a field. However, in some embodiments, the vehicle 10 may use tracks in place of the wheels 12. Though the vehicle 10 shown in FIG. 1 is an agricultural vehicle 10 (e.g., a tractor), it should be understood that this is merely an example and that the presently disclosed techniques may be applied to other types of agricultural vehicles (e.g., combines, harvesters, balers, seeders, planters, sprayers, tillers, etc.) and, indeed, other vehicles outside of the agricultural space, such as construction equipment (excavators, mini-excavators, backhoe loaders, wheel loaders, skid steer loaders, motor graders, compact truck loaders, graders, forklifts, dozers, etc.), public transportation equipment, consumer vehicles, commercial vehicles, aircraft, rail-based vehicles, forklifts, cranes, and so forth. In some embodiments, the vehicle 10 may be configured to tow an agricultural implement (e.g., via a hitch 14) in the performance of an operation (e.g., tilling, planting, spraying, harvesting, earth moving, etc.).

The vehicle includes a cab 16 in which an operator sits while controlling operation of the vehicle 10. In the vehicle 10 shown in FIG. 1, the cab 16 is a closed cab, however, in other embodiments, the cab 16 may be an open-air cab. The cab 16 includes a seat 18, on which the operator sits and an interface 20 (e.g., a computer monitor), which may be configured to display information about the vehicle 10 and/or an implement coupled to the work vehicle. In some embodiments, the operator may use the interface 20 as an operator interface to configure various aspects of the vehicle 10 and/or the implement. In some embodiments, the interface 20 may include a keypad, a track pad, or buttons, or the interface 20 may be a touch-screen display. In some embodiments, the cab 16 may also include a microphone and/or speakers, a camera, and/or a wearable sensor by which an operator may interface with the vehicle 10.

Figure 2:
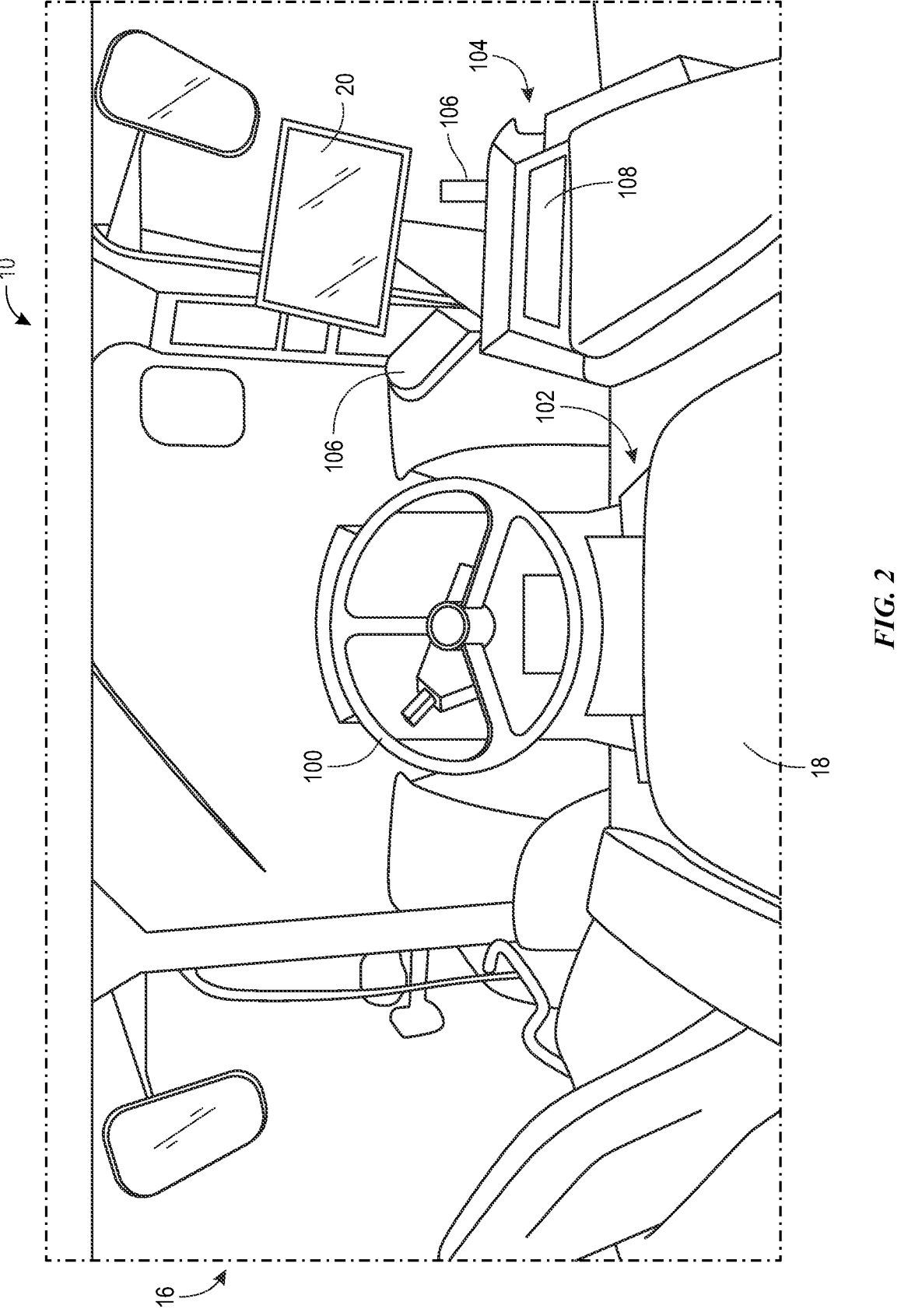
FIG. 2 is a perspective view of an embodiment of an interior of a cab of the work vehicle of FIG. 1, in accordance with embodiments presented herein.

FIG. 2 is a perspective view of an embodiment of an interior of the cab 16 of the work vehicle 10 of FIG. 1 (e.g., from the operator's perspective). As illustrated, the cab 16 includes the seat 18, on which the operator sits when operating the vehicle 10. In the illustrated embodiment, a steering wheel 100 is located near the seat 18, so as to be within arm's reach of the operator when the operator is seated on the seat 18. Though a steering wheel 100 is included in the illustrated embodiment, other embodiments of the vehicle 10 may include other devices for receiving steering inputs from the operator. For example, in place of a steering wheel, the cab 16 may have left/right control bars, a yoke, one or more joysticks, a hand controller, pedals, or another suitable device for receiving steering inputs. Also located near the seat 18, at the operator's feet are one or more pedals 102. The pedals 102 may be configured to receive input from the operator for controlling the speed of the vehicle 10. For example, the pedals 102 may control a throttle, brakes, a clutch, other suitable systems, or a combination thereof. In other embodiments, pedals 102 may be used for steering inputs. Further, in embodiments in which the vehicle 10 is semi-autonomous or fully autonomous, the steering wheel and/or the pedals may be omitted.

Along one or both sides of the seat 18 may be an armrest 104. The armrest 104 may include one or more hand controllers 106, the interface 20, and one or more buttons 108. The interface 20 may be used to present data to the operator, such as vehicle information (e.g., ground speed, oil pressure, engine temperature, alerts, etc.), implement operations information (e.g., rotor speed and grain loss), and manufacturer proprietary systems information (e.g. yield maps, position data, planned routes, etc.). The hand controllers 106 and buttons 108 may enable the operator to control the vehicle 10 by inputting commands or instructions, which may be represented on the interface 20. For example, one hand controller 106 may control a cursor on the interface 20 such that movement of the hand controller 106 corresponds to movement of the cursor. In other embodiments, the interface 20 may be a touchscreen. By navigating menus on the interface 20, the operator may control various aspects of the vehicle 10 and/or an implement coupled to or towed by the vehicle 10.

Figure 3:
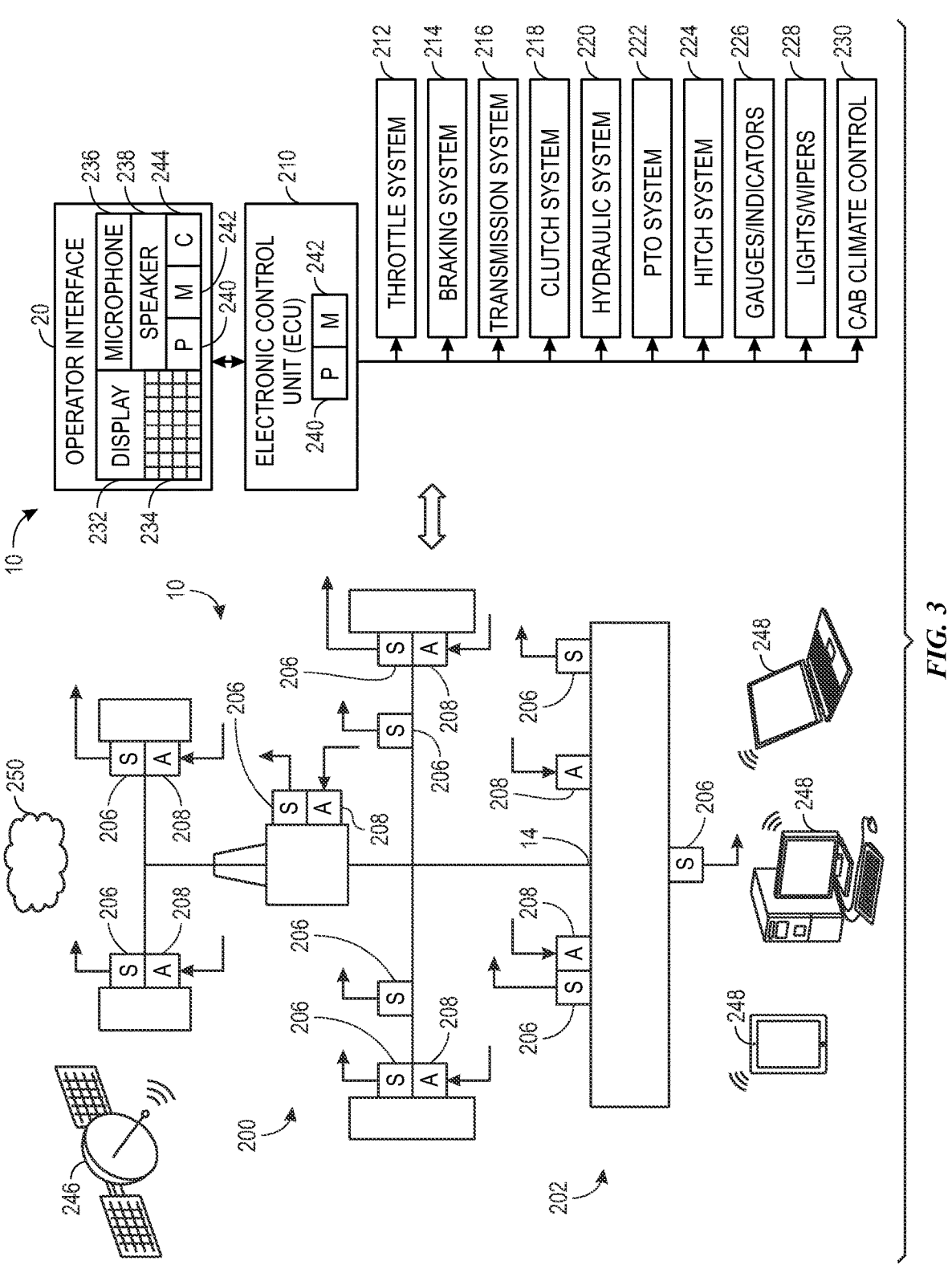
FIG. 3 is a schematic of an agricultural system that includes the vehicle of FIGS. 1 and 2 coupled to an implement via a hitch, in accordance with an embodiment.

FIG. 3 is a schematic of an agricultural system 200 that includes the vehicle 10 (e.g., tractor) coupled to an add-on piece of equipment 202 (e.g., an implement, connected via a hitch 14). As shown, the system 200 may include a number of sensors 206 and actuators 208 distributed throughout the system 200. For example, the sensors 206 may be configured to collect information or sense parameters indicative of qualities related to an engine, a motor, a suspension system, a steering system, a navigation system, a clutch or transmission system, a hydraulic system, a hitch, an implement engagement, an implement height, an implement pitch, an implement speed, implement position, an environment inside the cab, wipers, and/or other information about the agricultural system 200. Similarly, the actuators 208 may be configured to receive commands (e.g., from an engine control unit (ECU)) and make adjustments related to the engine, the motor, the suspension system, the steering system, the navigation system, the clutch or the transmission system, the hydraulic system, the hitch, the implement engagement, the implement height, the implement pitch, the implement speed, the implement position, cab lights, cab HVAC, and the like.

The various sensors 206 and actuators 208 may be part of, or be in communication with, various systems of the vehicle 10 or implement 204. Such systems may include, among others, the operator interface 20, an ECU 210, a throttle system 212, a braking system 214, a transmission system 216, a clutch system 218, a hydraulic system 220, a power take-off (PTO) system 222, a hitch system 224, gauges/indicators 226, lights/wipers 228, cab climate control 230, and the like.

The operator interface 20 may be disposed inside the cab of the vehicle 10. In some embodiments, there may be multiple operator interfaces 20 for a given agricultural system. The operator interface 20 may be configured to display information for, and receive inputs from, an operator. In the illustrated embodiment, the operator interface 20 includes a display 232, operator inputs 234, a microphone 236, a speaker 238, processing circuitry 240 (e.g., one or more processors and/or one or more processing cores), a memory component 242, and communication circuitry 244. The display 232 of the operator interface 20 may be configured to display information related to the agricultural system 200 to the operator. The display 232 may be a screen, a projected display (e.g., a heads-up display), a virtual reality or augmented reality headset, an array of LEDs, a series of gauges, a combination thereof, or some other arrangement. The operator inputs 318 may be a keyboard, a series of buttons, a joystick, a mouse, a track pad, a remote controller, etc. In some embodiments, the display 232 and the operator input 234 may be combined into a single component (e.g., a touchscreen).

The microphone 236 may be disposed in the configured to detect noises in the cab such that the operator interface 20 can use microphone 236 to receive audio commands (e.g., voice commands) from the operator. The microphone 236 may be mounted to a surface within the cab of the vehicle 10, worn by the operator (e.g., clipped to the operator's clothing, worn around the operator's neck, etc.), or incorporated into a headset worn by the operator. The speaker 238 may be configured project audio to be heard by the operator. The speaker 238 may include one or more speakers 238 mounted to the interior of the cab of the vehicle 10 and configured to project audio that is audible by the operator. In other embodiments, the speaker 238 may include headphones worn by the operator, which may or may not be part of a headset worn by the operator.

In some embodiments, the operator interface 20 may also include one or more cameras, imaging sensors, or handheld/wearable sensors configured to detect gestures made by the operator. Gestures may be associated with inputs/commands used to control various aspects of the vehicle in addition to voice commands and/or inputs provided via the operator interface.

The processing circuitry 240 may include one or more general-purpose processors, one or more application specific integrated circuits, one or more field programmable gate arrays, or the like. The memory 242 may be any tangible, non-transitory, computer readable medium that is capable of storing instructions executable by the processing circuitry 240 and/or data that may be processed by the processing circuitry 240. The memory 242 may include volatile memory, such as random access memory, or non-volatile memory, such as hard disk drives, read-only memory, optical disks, flash memory, and the like.

The communication circuitry 244 may be configured to communicate with the various other systems 210, 212, 214, 216, 218, 220, 222, 224, 226, 228, 230, and interface between the operator interface 20 and the various systems 210, 212, 214, 216, 218, 220, 222, 224, 226, 228, 230. In some embodiments, the communication circuitry 244 may communicate with various systems within the agricultural system 200 wirelessly. In some embodiments, the operator interface 20 and one or more of the other systems 210, 212, 214, 216, 218, 220, 222, 224, 226, 228, 230 may be disposed within the same housing, may share processing circuitry 240, and/or memory components 242.

Though not specifically shown in FIG. 3, in some embodiments, the operator interface 20 may include a vehicle navigation system. In such embodiments, the vehicle navigation system may include a Global Navigation Satellite System (GNSS) receiver configured to communicate with two or more satellites 246 in orbit (e.g., GPS, GLONASS, Galileo, BeiDou, etc.) to determine the location, heading, speed, etc. of the vehicle 10. The receiver may utilize the one or more processors 240 and/or the memory component 242, or the receiver may have its own processor(s) and/or memory, input/output, power supply, radio circuitry, and so forth. In some embodiments, the receiver may also include an internal measurement unit, which can be used for terrain compensation (e.g., compensating for receiver motion due to pitch and roll of the vehicle) and dead-reckoning (e.g., checking motion of GPS against inertial measurements to detect invalid GPS positions, such as GPS hops, etc.). The processors may run software stored on the memory component to compute the position of the vehicle 10. Based on the computed position, the processor may also determine vehicle 10 heading, speed, etc. The navigation system may use the vehicle position, speed, heading, etc. to guide the vehicle to a given location or along a desired path.

The ECU 210 acts as an interface between the operator interface 20 and the various systems 212, 214, 216, 218, 220, 222, 224, 226, 228, 230 of the vehicle 10. For example, the ECU 210 may be configured to receive inputs and/or commands from the operator interface 20 and control the various systems 212, 214, 216, 218, 220, 222, 224, 226, 228, 230 based on the received inputs and/or commands. This may include, for example, receiving the inputs and/or commands, analyzing and/or processing the inputs and/or commands, and generating one or more control signals or commands for one or more of the various systems 212, 214, 216, 218, 220, 222, 224, 226, 228, 230 based on the received inputs and/or commands. Additionally, the ECU 210 may be configured to receive information from the various systems 212, 214, 216, 218, 220, 222, 224, 226, 228, 230 and/or sensors disposed within or near the various systems 212, 214, 216, 218, 220, 222, 224, 226, 228, 230, analyze and/or process the received data, and convey the information to the operator via the operator interface. The information may include, for example, alerts/alarms/notifications, measured values, operational parameters, and so forth. The information maybe conveyed to the operator via the operator interface 20 by displaying alerts/alarms/notifications, displaying a graph, plot, or other visualization, displaying a value, displaying one or more statistics, etc. As shown, the ECU 210 may include processing circuitry 240 and memory 242, which may be the same or different as the processing circuitry 240 and memory 242 of the operator interface 20. The memory 242 may be configured to store program instructions that, when executed by the processing circuitry 240, cause the processor to perform various actions.

As described in more detail below, the memory 242 may store a large language model (LLM) that, when executed or accessed by the processing circuitry 240, may be configured to receive inputs, analyze the inputs, and generate outputs based on the analysis of the inputs. For example, in some embodiments, the ECU 210 may be configured to receive a natural language communication from the operator (e.g., via the microphone 236 or the operator inputs 234) with instructions to take an action, analyze the instructions, provide feedback and/or suggestions on the instructions, if any, receive modified instructions, if any, or any clarifications, and then implement the instructions via the various systems 212, 214, 216, 218, 220, 222, 224, 226, 228, 230 of the vehicle. In some embodiments, implementing the natural language instruction may involve ignoring or overriding other inputs provided by the operator via other inputs, such as levers, joysticks, steering wheels, buttons, etc.

In other embodiments, the ECU 210 may be configured to receive fault codes from the various systems 212, 214, 216, 218, 220, 222, 224, 226, 228, 230 of the vehicle, retrieve descriptions of the fault codes and/or remedial actions to address the fault codes, and provide the descriptions and/or remedial actions to the operator via the operator interface 20. In such embodiments, the operator may use the operator interface 20 to perform the remedial actions or provide instructions to the ECU to perform the remedial actions, request more information about the fault codes and/or remedial actions, provide instructions to ignore one or more of the fault codes, implement different remedial actions, and so forth.

In further embodiments, the ECU 210 may be configured to analyze inputs provided via the operator interface and actual performance of the various systems 212, 214, 216, 218, 220, 222, 224, 226, 228, 230 (e.g., based on data collected from one or more sensors 206, control signals or measured data from within the various systems 212, 214, 216, 218, 220, 222, 224, 226, 228, 230, etc.), recognize discrepancies between the inputs and the actual performance, notify the operator via the operator interface 20, provide information about what may be causing the issue, and recommend one or more remedial actions. For example, the operator may use a joystick, lever, knob, or other input device to provide instructions to move an arm to a 30-degree angle, but the arm only reaches 25 degrees. In such an instance, the ECU 210 may be able to detect the discrepancy, identify possible causes of the discrepancy, and suggest one or more remedial actions to address the discrepancy.

In another embodiment, the ECU 210 may be configured to collect data from various sensors 206 throughout the system 200, analyze the collected data, input the collected data to existing models of the system 200, identify one or more conditions that deviate from expected operation, warn the operator, and suggest changes to operation that may decrease wear to the system 200 and/or reduce the risk of failure. Along these lines, the ECU 210 may be configured to identify equipment misuse, warn the operator, and provide guidance to avoid misuse and/or follow recommended use, resulting in less wear on equipment, reduced chance of failure, and improved customer experience with the system 200. In some embodiments, the ECU 210 may input collected data to failure-driven mode models and provide alerts and/or recommendations to the operator. If the operator is not responsive to the alerts and/or recommendations after a period of time and the vehicle is approaching a failure mode, the ECU 210 may automatically take corrective action to avoid the failure mode without explicit approval from the operator.

In other embodiments, the operator may provide a request for information (e.g., from the operator manual of the vehicle 10, the implement 202, the agricultural system 200, a component of the agricultural system 200, etc.) via the operator interface 20. The ECU may be configured to process the request, identify and retrieve the requested information, and relay the requested information to the operator via the operator interface 20 (e.g., via the display 232, the speaker 238, etc.).

The throttle system 212 may be configured to control the throttle of the vehicle 10, and thus control the speed of the vehicle 10 by controlling a speed (e.g., in rpm) of a motor or engine (e.g., one or more electric motors, an internal combustion engine that runs on gasoline, natural gas, or other hydrocarbons, a hydrogen engine, etc., a hybrid engine, and so forth). For example, the throttle system 212 may be configured to vary the output of an engine or motor to control the speed of the vehicle 10. The throttle system 212 may do so by varying a throttle setting of the engine, a fuel/air mixture of the engine, a timing of the engine, and/or other suitable engine parameters to control engine output. The vehicle throttle system 212 may be controlled by the operator in a manual mode of operation. In an automatic or semi-automatic mode of operation, the vehicle throttle system 212 may be controlled automatically or semi-automatically. The throttle system 212 may be different from a traditional throttle system of a vehicle to allow the ECU 210 to implement commands received from the operator. For example, the throttle system 212 may be equipped with one or more sensors configured to detect a position of a throttle pedal or lever. The throttle system 212 may then transmit the detected position to the ECU 210 (e.g., via CANJ1939, CAN FD J1939, SAE J3072, SAE J2798, and/or LIN protocols), receive commands from the ECU 210 to adjust the throttle setting, and implement the received commands.

The braking system 214 may be configured to utilize disc brakes, drum brakes, or other brakes to slow the speed of the vehicle 10 and/or prevent the vehicle from moving. For example, the braking system 214 may adjust one or more braking forces, thereby controlling the speed of the vehicle 10. The braking system 214 may be controlled by the operator in a manual mode of operation. In an automatic or semi-automatic mode of operation, the braking system 214 may be controlled automatically or semi-automatically. The braking system 214 may be different from a traditional braking system of a vehicle to allow the ECU 210 to implement commands received from the operator. For example, the braking system 214 may be equipped with one or more sensors configured to detect a position of a brake pedal or lever. The braking system 214 may then transmit the detected position to the ECU 210 (e.g., via CANJ1939, CAN FD J1939, SAE J3072, SAE J2798, and/or LIN protocols), receive commands from the ECU 210 to adjust the brake setting, and implement the received commands.

The transmission system 216 may be used to put the vehicle 10 into a selected gear from one or more available gears. For example, the transmission system 216 may adjust gear selection within a transmission to control the speed of the vehicle 10, an rpm of the vehicle 10, a torque of the vehicle, and so forth. For example, the transmission system 216 may allow for manual or automatic changing of gears or a gear ratio via the transmission as a way to control the speed of the vehicle. The transmission may include a number of fixed gear ratios or a continuously variable gear ratio. The transmission system 216 may be controlled by the operator in a manual mode of operation. For example, in some embodiments, an operator may select a particular gear of a plurality of available gears. In other embodiments, the operator may select gears sequentially by providing up/down inputs that move the gear selection up or down the available gears in order. In an automatic or semi-automatic mode of operation, the transmission system 216 may be controlled automatically or semi-automatically. The transmission system 216 may be different from a traditional transmission system of a vehicle to allow the ECU 210 to implement commands received from the operator. For example, the transmission system 216 may be equipped with one or more sensors configured to detect a position of a transmission knob, lever, paddle, etc. The transmission system 216 may then transmit the detected position to the ECU 210 (e.g., via CANJ1939, CAN FD J1939, SAE J3072, SAE J2798, and/or LIN protocols), receive commands from the ECU 210 to adjust the brake setting, and implement the received commands.

The clutch system 218 may act as an interface between the transmission system 216, the engine/motor, and/or the throttle system 212. Accordingly, the clutch system 218 may be configured to match speeds between a gear of the transmission and the engine/motor, engage the gear of the transmission with the engine/motor, and disengage the gear of the transmission from the engine/motor. For example, clutch system 218 may allow for manual or automatic control of the clutch. In manual mode, the operator may control the clutch via a foot-operated control, such as a pedal or via a hand-operated control, such as a lever. In an automatic mode, the clutch system 218 may automatically control the clutch when gears are changed (e.g., either automatically or based on an input from the user). The clutch system 218 may be different from a traditional clutch system of a vehicle to allow the ECU 210 to implement commands received from the operator. For example, the clutch system 218 may be equipped with one or more sensors configured to detect a position of a clutch pedal or lever. The clutch system 218 may then transmit the detected position to the ECU 210 (e.g., via CANJ1939, CAN FD J1939, SAE J3072, SAE J2798, and/or LIN protocols), receive commands from the ECU 210 to adjust the clutch setting, and implement the received commands.

The hydraulic system 220 may be configured to manage hydraulics on the vehicle 10 and, in some cases, the implement 202. The hydraulic system may include, for example, one or more reservoirs for hydraulic fluid, one or more hydraulic lines, one or more hydraulic cylinders, one or more actuators, one or more valves, etc. Because the hydraulic system 220 may be spread across the vehicle 10 and the implement 202, the hydraulic system 220 may include one or more couplings or interfaces for coupling and decoupling hydraulic subsystems. Further, because the vehicle 10 and the implement 202 may use hydraulics for different functions, the hydraulic system 220 may include multiple hydraulic subsystems, when may be interconnected or entirely separate from one another, for performing different tasks. The hydraulic system 220 may be different from a traditional hydraulic system of a vehicle to allow the ECU 210 to implement commands received from the operator. For example, the hydraulic system 220 may be equipped with one or more sensors configured to detect a position of one or more levers, buttons, or other input devices. The hydraulic system 220 may then transmit the detected position to the ECU 210 (e.g., via CANJ1939, CAN FD J1939, SAE J3072, SAE J2798, and/or LIN protocols), receive commands from the ECU 210 to adjust the hydraulic system, and implement the received commands.

For example, the hydraulic system may include or interface with a vehicle steering system that uses hydraulics to control the steering of the vehicle 10. For example, the vehicle steering system may include a wheel angle control system, a differential braking system, a torque vectoring system, and the like. The wheel angle control system may automatically rotate one or more wheels or tracks of the vehicle 10 (e.g., via mechanical, electric, or hydraulic actuators) to steer the vehicle 10 along a path. By way of example, the wheel angle control system may rotate front wheels/tracks, rear wheels/tracks, and/or intermediate wheels/tracks of the vehicle 10, either individually or in groups. In some embodiments, steering may be accomplished by varying the speed of wheels or tracks on either side of the vehicle. In some embodiments, the wheel angle control system may be hydraulically actuated rather than, or in addition to, mechanically actuated (e.g., via gears). A hydraulically actuated steering system may enable the agricultural vehicle 10 to turn without corresponding movement of a steering wheel (or other steering input device) inside the cab of the vehicle 10 during an automatic or semi-automatic drive mode. The differential braking system may independently vary the braking force on each side of the vehicle 10 to direct the vehicle 10 along the path. Similarly, the torque vectoring system may differentially apply torque from the engine to wheels and/or tracks on each side of the vehicle 10, thereby directing the vehicle 10 along the path. The steering system may be different from a traditional steering system of a vehicle to allow the ECU 210 to implement commands received from the operator. For example, the steering system may be equipped with one or more sensors configured to detect a position of a steering wheel, joystick, lever, or other input device. The steering system may then transmit the detected position to the ECU 210 (e.g., via CAN J1939, CAN FD J1939, SAE J3072, SAE J2798, and/or LIN protocols), receive commands from the ECU 210 to adjust the steering setting, and implement the received commands.

The hydraulic system 220 may also be used to control a vehicle suspension system may control the ride height of the vehicle 10 and/or the firmness of the vehicle's 10 ride. The vehicle suspension system may include an airbag suspension, springs and dampers, cylinders, or a combination thereof. The vehicle suspension system may use different settings when the vehicle 10 is moving in a field versus on a road. Similarly, the vehicle suspension system may have different settings when an implement 202 is attached to the vehicle 10. The vehicle suspension system may be controlled by the user, or automatically. In some embodiments, the vehicle suspension system may be controlled semi-automatically by allowing the operator to select a suspension mode (e.g., harsh ride, medium ride, soft ride, in field, on road, etc.).

In other embodiments, the hydraulic system 220 may be used to actuate a hitch of the hitch system, actuate an implement or an attached tool (e.g., an arm, a bucket, ground-engaging tools, etc.), and so forth. In such embodiments, the hydraulic system 220 may be used to raise or lower the implement or tool, turn the implement or tool on or off, adjust implement or tool pitch, or otherwise engage or disengage the implement or tool, deploy ground-engaging tools of the implement or tool, control the speed of the implement or tool, etc., or a combination thereof. The hydraulic system 220 may be controlled by the operator in a manual mode of operation. In an automatic or semi-automatic mode of operation, the hydraulic system 220 may be controlled automatically. In a fully automatic mode of operation, the hydraulic system 220 may be automatically controlled.

The power take-off (PTO) system 222 may be used to engage or disengage a PTO, which takes power from a local power source, such as an engine, and provides power to an attachment or implement. The PTO system 222 may be controlled by the operator in a manual mode of operation. In an automatic or semi-automatic mode of operation, the PTO system 222 may be controlled automatically. In a fully automatic mode of operation, the PTO system 222 may be automatically controlled.

The hitch system 224 may be used to control a position of a hitch (e.g., a three-point hitch). The hitch system 224 may be controlled by the operator in a manual mode of operation. In an automatic or semi-automatic mode of operation, the hitch system 224 may be controlled automatically. In a fully automatic mode of operation, the hitch system 224 may be automatically controlled.

The gauges/indicators system 226 may control how information is displayed to the operator by controlling what information is displayed and how the information is displayed. The lights/wipers system 228 may control exterior lights (e.g., headlights, taillights, sidelights, brake lights, etc.) and/or interior lights (e.g., cab lights) for the vehicle, as well as wipers that may be manually or automatically controlled. The cab climate control 230 may control the climate in the cab by controlling one of more air-conditioning units, one or more heating units, and/or one or more fans.

As shown in FIG. 3, the vehicle 10 may be accessible (e.g., via the communication circuitry 244) by one or more computing devices 248 (e.g., workstation computers, desktop computers, laptop computers, tablets, mobile devices, smartphones, human-machine interfaces, etc.), one or more cloud/remote servers 250, one or more satellites 246, etc. via a wired connection (e.g., via a cable, docking station, etc.) or a wireless connections (e.g., Bluetooth, wii, near field communication, the internet, cellular network, etc.) to configure the vehicle 10, update the vehicle 10, retrieve data from the vehicle 10, control the vehicle 10, etc.

Figure 4:
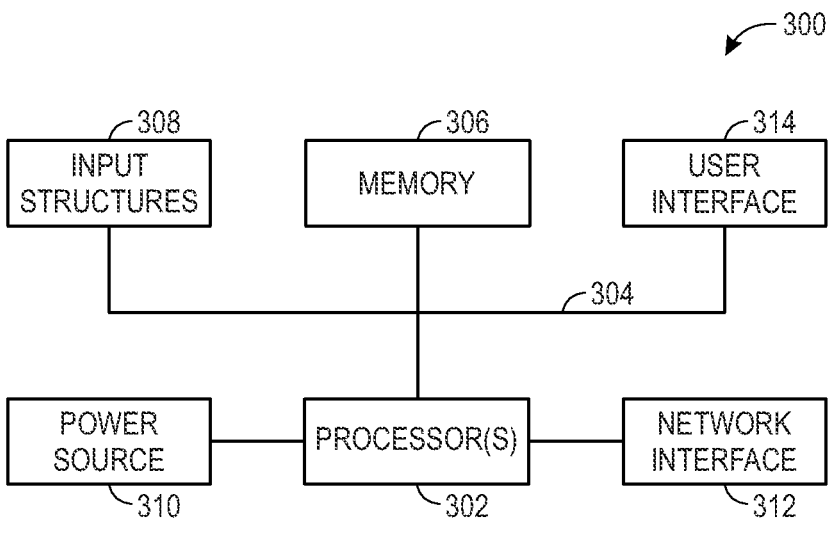
FIG. 4 is a block diagram of a computing device, in accordance with an embodiment.

FIG. 4 illustrates a block diagram of example components of a computing device 300 that could be used as the computing devices shown in FIG. 3. As used herein, a computing device 300 may be implemented as one or more computing systems including laptop, notebook, desktop, tablet, human machine interface (HMI), workstation computers, as well as server type devices or portable, communication type devices, such as cellular telephones, vehicle/equipment interfaces, virtual reality or augmented reality headsets, and/or other suitable computing devices.

As illustrated, the computing device 300 may include various hardware components, such as one or more processors 302, one or more busses 304, memory 306, input structures 308, a power source 310, a network interface 312, a user interface 314, and/or other computer components useful in performing the functions described herein.

The one or more processors 302 may include, in certain implementations, microprocessors configured to execute instructions stored in the memory 306 or other accessible locations. Alternatively, the one or more processors 302 may be implemented as application-specific integrated circuits (ASICs), field-programmable gate arrays (FPGAs), and/or other devices designed to perform functions discussed herein in a dedicated manner. As will be appreciated, multiple processors 302 or processing components (e.g., processing cores) may be used to perform functions discussed herein in a distributed or parallel manner.

The memory 306 may encompass any tangible, non-transitory medium for storing data or executable routines. Although shown for convenience as a single block in FIG. 4, the memory 306 may encompass various discrete media in the same or different physical locations. The one or more processors 302 may access data in the memory 306 via one or more busses 304.

The input structures 308 may allow a user to input data and/or commands to the device 300 and may include mice, touchpads, touchscreens, keyboards, controllers, cameras and/or imaging sensors, microphones, and so forth. The power source 310 can be any suitable source for providing power to the various components of the computing device 300, including line and battery power. In the depicted example, the device 300 includes a network interface 312. Such a network interface 312 may allow communication with other devices on a network using one or more communication protocols. In the depicted example, the device 300 includes a user interface 314, such as a display that may display images or data provided by the one or more processors 302. The user interface 314 may include, for example, a monitor, a display, a virtual reality and/or augmented reality headset, and so forth. In further embodiments, the user interface 314 may include a speaker or headset to project sounds that may be audible by the operator. As will be appreciated, in a real-world context a processor-based system, such as the computing device 300 of FIG. 4, may be employed to implement some or all of the present approach, such as performing the functions of the operator interface 20, the ECU 210, the various systems 212, 214, 216, 218, 220, 222, 224, 226, 228, 230, the computing devices 248, and/or the cloud/remote server 250 shown in FIG. 3, as well as other memory-containing devices.

Figure 5:
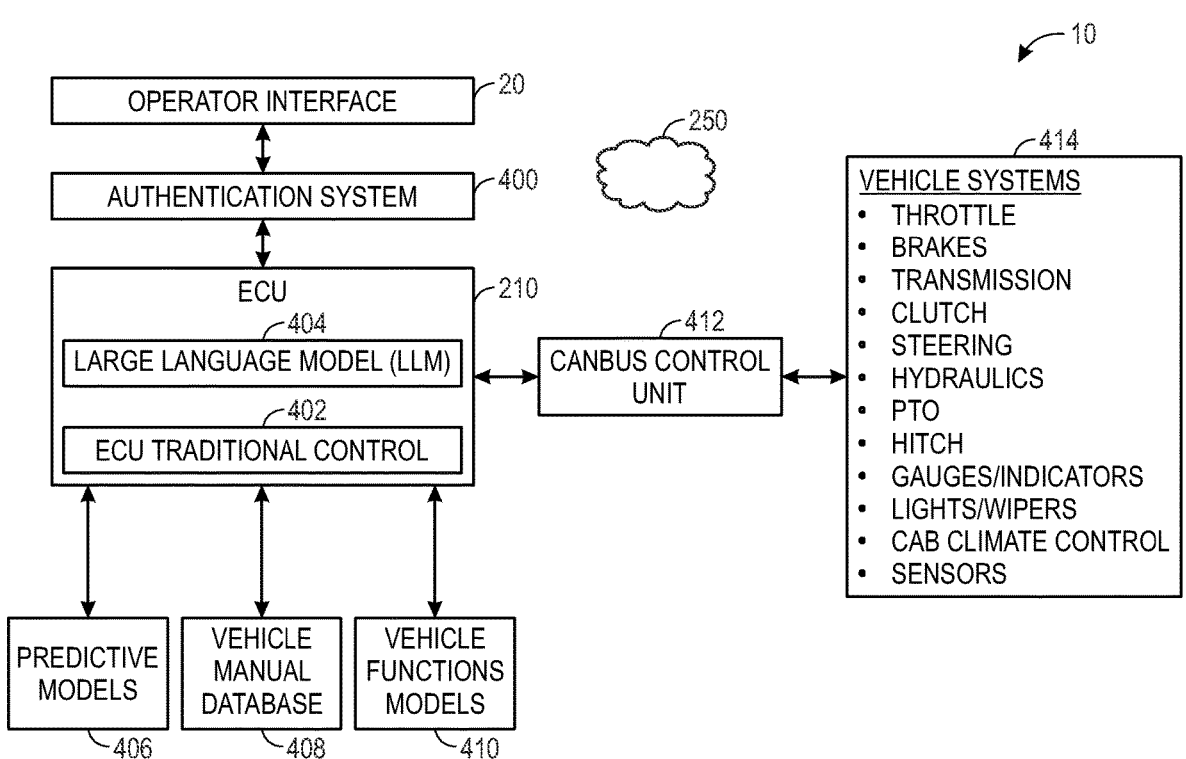
FIG. 5 is a schematic illustrating a large language model (LLM)-based artificial intelligence (AI) interface for in-cab function assistance that could be used in the work vehicle of FIGS. 1-3, in accordance with an embodiment.

FIG. 5 is a schematic illustrating a large language model (LLM)-based artificial intelligence interface for in-cab function assistance. As previously described with regard to FIG. 3, the operator may interact with the vehicle 10 via the operator interface 20, which may be mounted in the cab of the vehicle 10. In some embodiments, the vehicle 10 may include an authentication system 400, which may be configured to authenticate the operator and/or inputs/commands provided by the operator. In some embodiments, the authentication system 400 may be integrated into the operator interface 20, whereas in other embodiments, the authentication system 400 may be separate from the operator interface 20 and disposed between the operator interface 20 and the ECU 210, as shown in FIG. 5. The authentication system 400 may authenticate the operator via authentication credentials, such as a username and password, via biometrics, such as facial recognition, voice recognition, fingerprint scanning, retina scanning, and so forth. The authentication system may authenticate an operator for a specific period of time (5 minutes, 10 minutes, 1 hour, 2 hours, 6 hours, 24 hours), until some triggering condition occurs (e.g., the operator exits the cab of the vehicle, the operator signs out, etc.), or for each command (e.g., the authentication system 400 may authenticate the operator's voice for each voice command received). In some embodiments, the authentication system 400 may run software to perform the authentication. In embodiments in which the authentication system 400 is incorporated within the operator interface 20, the authentication system 400 may utilize the memory, processor, communication circuitry, etc. of the operator interface 20 to perform authentication. In other embodiments, the authentication system 400 may be equipped with its own hardware (e.g., memory, processor, communication circuitry, etc.) for performing authentication. Further, in some embodiments, the authentication system 400 may use two-factor authentication and rely on other devices, such as mobile devices, tablets, etc. to perform authentication.

As previously described, the ECU 210 may be equipped with traditional control system(s) 402 configured to receive inputs via the operator interface and generate commands (e.g., transmitted via a CAN network) to implement the inputs. The ECU 210 also stores one or more large language models (LLMs) 404 or instantiations of LLMs 404, which may be pre-trained and installed on the ECU 210. The LLM 4040 may be stored in memory and used by the processor to analyze and respond to operator inputs and data collected form the vehicle, as well as generate outputs (e.g., alerts, warnings, recommendations, etc.) to be provided to the operator. The LLM 404 may be trained by a manufacturer of the vehicle 10, a dealer/distributor, a service provider, etc. and provided to the vehicle 10 via a computing device, a mobile device, the internet, cellular network, a cloud/remote server, and so forth. The LLMs 404 may be trained specifically for particular customers, tasks, vehicles, equipment, industries, etc. In some embodiments, generic or general use LLMs (e.g., publicly available LLMs that are not trained with specific industries or applications in mind) may be used and supplemental training performed to cater the LLMs 404 to particular customers, tasks, vehicles, equipment, industries, etc. For example, training data may include product manuals, product designs, historical service records, customer feedback, customer service records, recall information, publicly available information about products, models (e.g., predictive models, such as failure mode models, vehicle function models), experimental data, preferred operating parameters, etc. Over time, updates to the one or more LLMs 404, new versions of the LLMs 404, and/or new LLMs 404 may be provided to the vehicle 10.

As shown, the LLM 404 may have access to various data, such as predictive models 406 (e.g., data driven failure mode models), a vehicle manual database 408, vehicle function models 410, and so forth. The predictive models 406 may include models of the vehicle 10, implements, components of the vehicle or implements, and failure modes based on operational parameters, amount of use, number of cycles, lifespan, measured parameters, detected conditions, and so forth. Accordingly, the LLM 404 may collect data from the vehicle (e.g., sensor data, control signal data, component position data, etc.) and input data provided by an operator, provide the data to a predictive models (e.g., a data driven failure mode model) and determine whether a component is nearing failure, approaching failure at a rapid rate, likely to lead to early failure, and so forth. The LLM 404 may then be able to alert the operator and/or provide one or more recommendations for delaying or avoiding failure.

The vehicle manual database 408 may be a database populated with manuals for different vehicles, pieces of equipment, etc. The manuals may include manuals for the vehicle 10 itself, related or similar vehicles, manuals for implements or tools used by the vehicle, manuals for components of the vehicle, and so forth. In some cases, the manuals may include vehicle/part specifications, troubleshooting guides, dimensions, capabilities, recommended operating parameters, suggested maintenance/service schedules, usage instructions, maintenance instructions, assembly instructions, information about replacement parts, etc. Accordingly, the LLM 404 may access the vehicle manual database 408 to retrieve data about the vehicle or one or more components of the vehicle and provide that information to the operator.

The vehicle function models 410 may include models of the vehicle, components of the vehicle, implements/tools, or components of implements/tools performing specific functions or operations. The LLM 404 may collect data from the vehicle (e.g., sensor data, control signal data, component position data, etc.) and input data provided by an operator, provide the data to the vehicle function models 410 and determine whether the vehicle, implement, component, etc. is operating in accordance with the vehicle function models, determine if any adjustments to operational parameters would improve performance, and, if so, provide recommendations to the operator.

It should be understood that these are merely examples and that other data sources may be available to the LLM 404. Such data may be stored locally in memory of the ECU 210, remotely accessible (e.g., via the internet, the cloud, etc.), or some combination thereof. In other embodiments, these data sources may be provided during training of the LLM 404 and incorporated into the LLM 404 via training.

In present embodiments, the LLM 404 may be trained by a third party (e.g., a manufacturer of the vehicle, a manufacturer of an implement or tool, a dealer/distributor of the vehicle or implement, a service provider, etc.) and then stored in the ECU 210 of the vehicle. Accordingly, the LLM 404 may be static once installed on the ECU 210 and does not receive any additional training or do any learning while running on the ECU 210. That is, the LLM 404, once installed on the ECU 210 becomes a closed loop system that does not learn while being utilized on the ECU 210. When the LLM 404 is provided to the ECU 210, the LLM 404 may arrive with set boundaries and/or guidelines that dictate what the LLM 404 is authorized to do, ranges of operational parameters that the LLM 404 is authorized to utilize, and so forth. In some embodiments, the boundaries and/or guidelines may be modified by an operator or administrator, but not by the LLM itself based on learning from collected data. By providing boundaries and/or guidelines that are provided by the third party, the risk of the LLM 404 directing the vehicle to do something that may lead to injury, loss of life, damage to property, damage to the vehicle itself, etc. is greatly reduced or eliminated.

Once installed on a vehicle, updates to LLMs 404, updated LLMs 404, or entirely new LLMs 404 may be provided to customers to add to or supplement existing LLMs 404. The updates and/or new LLMs 404 may be obtained from dealers or service providers (e.g., when the vehicle 10 is in for service), provided to the vehicle using a tethered mobile device (e.g., via a mobile application), from a connected computing device (e.g., via a cable connection, docking station, etc.), or via an internet/cloud/cellular connection or satellite connection if the vehicle is connected.

As is described in more detail below, the LLM 404 may receive a command from an operator provided via the operator interface 20. The command may be a voice command, a gesture, an input provided via operator inputs, etc. As previously described, an authentication system 400 may screen received commands such that only authenticated commands or commands from an authenticated user pass through the authentication system 400 to the ECU 210. The LLM 404 may receive the command and analyze the command (e.g., based on the predictive models 406, the vehicle manual database 408, the vehicle function models 410, and/or other data sources) to determine if the command is consistent with normal and/or recommended operation of the vehicle 10. For example, the LLM 404 may match current conditions to a model (e.g., a predictive model, a vehicle function model, or some other model), confirm the command and provide guidance to the operator if the command is not within expected parameters. For example, the LLM 404 could warn the operator that engine gaskets may be damaged by traveling at the commanded speed for a prolonged period of time. In some embodiments, the operator may ask for more information before making a decision, which the LLM 404 could retrieve and provide to the operator.

If the command is not consistent with normal and/or recommended operation of the vehicle 10, the LLM 404 may respond to the operator via the operator interface 20 (e.g., via a visual or audio notification) providing a recommended modification to the command, requesting more information about the command, asking the operator to confirm the command, etc. In some embodiments, the operator may accept the modification, provide a different modification to the command, confirm the command, provide a different command, cancel the command, etc. The operator may also request more information, at which point the LLM 404 may retrieve the requested information and provide the requested information to the operator. Upon receipt of the command, confirmation of the command, a modified command, etc. the LLM 404 may cause the ECU 210 to generate a command to transmit to a control area network (CAN) bus control unit 412, which provides the command to one or more of the vehicle systems 414 for implementation.

The CAN bus control unit 412 controls a CAN bus that facilitates communication between the ECU 210 and the various vehicle systems 414. CAN bus is a vehicle bus standard that allows microcontrollers, devices, and other components of a vehicle's systems to communicate with one another without a host computer. CAN bus is a message-based protocol that can also be used in many different types of vehicles (e.g., agricultural equipment, passenger vehicles, aircraft, elevators, escalators, rail-based vehicles, watercraft, bicycles, etc.). Though the control unit 412 shown is a CAN bus control unit 412, it should be understood that embodiments are envisaged in which the control unit 412 is compatible with controller area network flexible data-rate (CAN FD) and/or local interconnect network (LIN) protocols. For each device communicatively coupled to a CAN bus, the data in a given message or frame is transmitted serially, but if more than one device attempts to transmit data at the same time, the data associated with the highest priority device, as determined based on the device identifier, is transmitted first, and then followed by the data associated with the lower priority device(s), based on priority. The ECU 210 may be considered a node of a CON network and each of the various vehicle systems 414 may also include one or more nodes on the CAN network. The devices or systems associated with each of the nodes may communicate with one another via the CAN network. Each node may include, for example, a central processing unit, a microprocessor, or other processing circuitry, a CAN controller configured to receive, store, and transmit messages in bits, and a transceiver configured to receive, convert, and transmit data streams. Each node may also be associated with one or more sensors and/or actuators of respective vehicle systems 414. Accordingly, the CAN network, managed by the CAN bus control unit 412, may be used to pass data (e.g., sensor data, commands, set points, actuator position, motor speed, etc.) between the ECU 210 and the various vehicle systems 414.

Accordingly, the various vehicle systems 414 may receive commands from the ECU 210 via the CAN bus control unit and the CAN network. Upon receipt of a command by one of the vehicle systems 414 (e.g., throttle, brakes, transmission, clutch, steering, hydraulics, PTO, hitch, gauges/indicators, lights/wipers, cab climate control, sensors, etc.), the vehicle system may implement the command. For example, the throttle system may adjust a throttle setting based on the command. The braking system may adjust a braking level based on the command. A transmission system may change gears based on the command. A clutch system may engage or disengage a clutch based on the command. The steering system may adjust a steering position based on the command. The hydraulic system may actuate one or more hydraulic subsystems or actuators based on the command. A PTO system may engage or disengage a PTO based on the command. A hitch system may actuate a hitch based on the command. One or more gauges or indicators may update in response to the command. Interior or exterior lights may turn on or off in response to the command. Wipers may turn on, turn off, speed up, or slowdown in response to the command. A cab climate control system, may turn on or off a fan, an air-conditioning system, and/or a heating system in response to the command.

As previously described, the various vehicle systems 414 may include one or more sensors or other components configured to monitor operation of the various vehicle systems 414. If monitored data is out of the ordinary, outside of expected windows, outside of one or more threshold values, error/fault codes are retrieved, etc., the LLM 404 may receive this data from the various vehicle systems 414 via the CAN bus control unit 412, retrieve information about the received data, identify possible causes, recommended remedial actions, etc. and notify the operator via the operator interface. In response, the operator may request more information, provide one or more commands (e.g., to implement one or more recommended remedial actions, implement one or more different actions, and so forth). The LLM 404 may go through a similar process of retrieving requested information and providing it to the operator, implementing commands received from the operator, and so forth to resolve the issue and/or continue operation of the vehicle 10.

Figure 6:
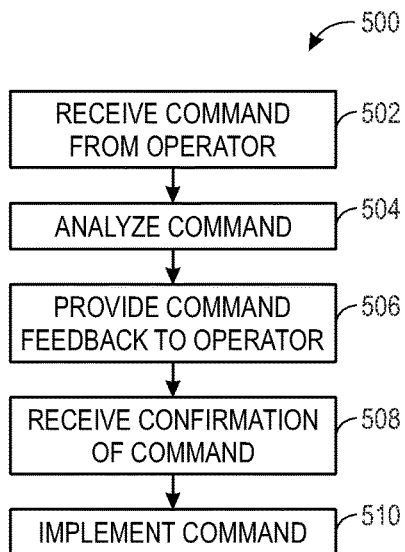
FIG. 6 is a flow chart of a process for receiving and implementing an operator command using LLM-based AI, in accordance with an embodiment.

FIG. 6 is a flow chart of a process 500 for receiving and implementing an operator command using LLM-based AI. At block 502, the process 500 receives a command from an operator. The command may be a vocal command received via a microphone, an input provided via a user interface (e.g., a touchscreen, a keyboard, a button, a joystick, a lever, etc.), a gesture (e.g., captured by an imaging system, a wearable sensor, etc.), some other form, or a combination thereof. The command may be a command to adjust an aspect of the operation of the vehicle. For example, the command may be to speed up, slow down, travel at a specific speed, come to a stop, start moving in a direction, engage an implement, disengage an implement, increase the speed of the implement, decrease the speed of the implement, change gears, change directions, engage the clutch, disengage the clutch, adjust one or more hydraulic systems, engage the PTO, disengage the PTO, adjust a position of the hitch, adjust gauges or indicators in the cab, change information displayed by gauges or indicators in the cab, adjust climate controls in the cab, retrieve information from a product manual, diagnose a condition, provide more information about fault codes, error messages, or alerts, recommend remedial actions to address a condition, recommend modifications to operating parameters, provide maintenance/service information, etc.

At block 504, the process 500 may analyze the command to determine whether the command meets certain guidelines and/or criteria. The analysis may include, for example, modeling the performance of the vehicle (e.g., via the predictive models, the vehicle function models, etc.) if the command were actually implemented, determining whether implementing the command would keep one or more operational parameters in recommended windows, determining whether implementing the command would cause one or more operating parameters to exceed or drop below one or more threshold values, or whether implementing the command would result in inadvisable operating conditions, etc.

At block 506, the process may provide command feedback to the operator. For example, in some embodiments the process 500 may warn the operator that the command may result in undesirable operating conditions, such as inadvisable speeds, running the risk of overheating, causing excessive wear, etc. In such embodiments, the process 500 may ask the operator if the operator is sure he or she wishes to implement the command and/or modifications to the command, such as a change in operating parameters, a change in order of operations, and so forth. The feedback may be provided via a screen of the user interface, in which the operator may be presented with one or more options. In other embodiments, the feedback may be provided via an audio message played over a speaker. At block 508, the process 500 may receive confirmation of the command, which may or may not include modifications from the originally received command. If the analysis of the originally received command determines that the command meets certain guidelines and/or criteria (e.g., is reasonable) and no feedback is generated, blocks 506 and 508 may be omitted and the process 500 may proceed to block 510.

At block 510, the command is implemented. As previously described, implementing the command may include, for example, generating a command message and transmitting the command message across a CAN network to one or more nodes associated with one or more respective vehicle systems. The command may be implemented by actuating one or more actuators, collecting data from one or more sensors, adjusting one or more operating parameters, and so forth.

Figure 7:
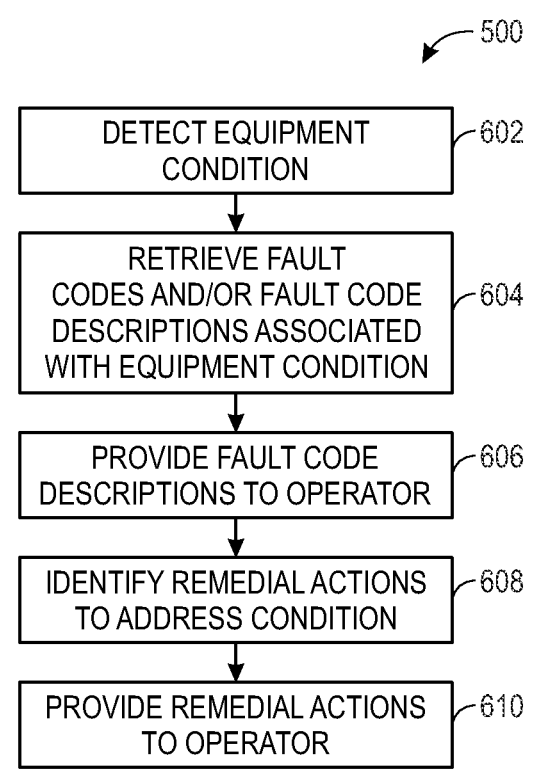
FIG. 7 is a flow chart of a process for detecting and resolving conditions of a vehicle using LLM-based AI, in accordance with an embodiment.

FIG. 7 is a flow chart of a process 600 for detecting and resolving conditions of a vehicle using LLM-based AI. At block 602, the process 600 detects an equipment condition. Detection of the equipment condition may be based on a fault code, an alert, an alarm, a measured value exceeding a threshold value or being otherwise outside of a window of expected/recommended values, an operational parameter exceeding a threshold value or being otherwise outside of a window of values, one or more measured and/or monitored values being indicative of the condition when provided to one or more models (e.g., predictive model, such as a data driven failure mode model, a vehicle function model, etc.).

At block 604, the process 600 retrieves fault codes and/or fault code descriptions associated with the detected condition. In some embodiments, the process 600 may retrieve additional information about the detected condition, such as possible causes of the condition, and so forth.

At block 606, the fault code descriptions and/or other information about the detected condition are provided to the operator via the operator interface. For example, the fault code descriptions and/or other information may be visually displayed to an operator on a display of the operator interface, or may be provided to the operator in an audio format via a speaker in the cab of the vehicle. In some embodiments, if the operator requests additional information (e.g., via a voice command, input to the operator interface, gesture, etc.), the process 600 may be configured to retrieve the requested additional information and provide it to the operator in an audio or visual format.

At block 608, the process 600 identifies one or more possible remedial actions to address the detected condition. Remedial actions may be identified based on, for example, one or more models (e.g., a predictive model, a vehicle function model, etc.), product manuals, historical data, customer service records, troubleshooting guides, help from a remote agent, one or more databases, online forums, etc.

At block 610, the process 600 may provide the remedial actions to the operator. This may include, for example, walking the operator through a troubleshooting guide in which the process suggests an action, the operator performs the action, or not, provides the results of the action, and the process proceeds to the next action in the troubleshooting guide. In some embodiments, rather than a linear troubleshooting guide, the process 600 may follow a troubleshooting decision tree in which the results of one action determine the subsequent action to take. Along these lines, if there are multiple recommended remedial actions, or a given remedial action includes multiple steps, the process 600 may walk the operator through step-by-step, providing specific instructions for how to perform each step or action, and providing additional guidance if the operator runs into a problem or is otherwise unable to perform a step/action.

Figure 8:
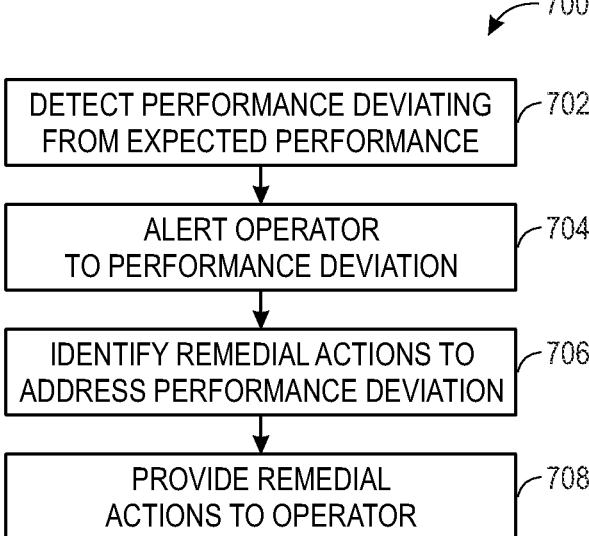
FIG. 8 is a flow chart of a process for detecting and resolving performance deviations of the vehicle using LLM-based AI, in accordance with an embodiment.

FIG. 8 is a flow chart of a process 700 for detecting and resolving performance deviations of a vehicle using LLM-based AI. At block 702, the process 600 detects that performance of the vehicle, a component of the vehicle, an implement, or a component of the implement is deviating from expected performance. Detection of the deviation may be based a measured value exceeding a threshold value or being otherwise outside of a window of values, an operational parameter exceeding a threshold value or being otherwise outside of a window of values, one or more measured and/or monitored values being outside of preferred ranges when provided to one or more models (e.g., a predictive model, such as a data driven failure mode model, a vehicle function model, etc.). In some embodiments, the performance deviation may be a discrepancy between operator inputs and actual performance. For example, the operator may provide commands to travel at a given speed and the vehicle fails to achieve the speed. In other embodiments, the operator may provide inputs to move an arm or a tool to a specific position (e.g., 30 degrees), but the vehicle fails to achieve the position (e.g., the arm or tool only reaches 25 degrees).

At block 704, an alert is provided to the operator notifying the operator of the deviation. For example, the alert may be visually displayed to the operator on a display of the operator interface, or may be provided to the operator in an audio format via a speaker in the cab of the vehicle. If the operator requests additional information (e.g., via a voice command, input to the operator interface, gesture, etc.), the process 700 may be configured to retrieve the requested additional information and provide it to the operator in an audio or visual format.

At block 706, the process 700 identifies one or more possible remedial actions to address the performance deviation. Remedial actions may be identified based on, for example, one or more models (e.g., a predictive model, a vehicle function model, etc.), product manuals, historical data, customer service records, troubleshooting guides, help from a remote agent, one or more databases, online forums, etc.

At block 708, the process 700 may provide the remedial actions to the operator. This may include, for example, suggesting one or more modifications to operating parameters, suggesting a different order of operations, suggesting additional or fewer steps. In some embodiments, the process 700 may walk the operator through a troubleshooting guide in which the process 700 suggests an action, the operator performs the action, or not, provides the results of the action, and the process proceeds to the next action in the troubleshooting guide. As previously discussed, in some embodiments, rather than a linear troubleshooting guide, the process 700 may follow a troubleshooting decision tree in which the results of one action determine the subsequent action to take. Along these lines, if there are multiple recommended remedial actions, or a given remedial action includes multiple steps, the process 700 may walk the operator through step-by-step, providing specific instructions for how to perform each step or action, and providing additional guidance if the operator runs into a problem or is otherwise unable to perform a step/action.

Figure 9:
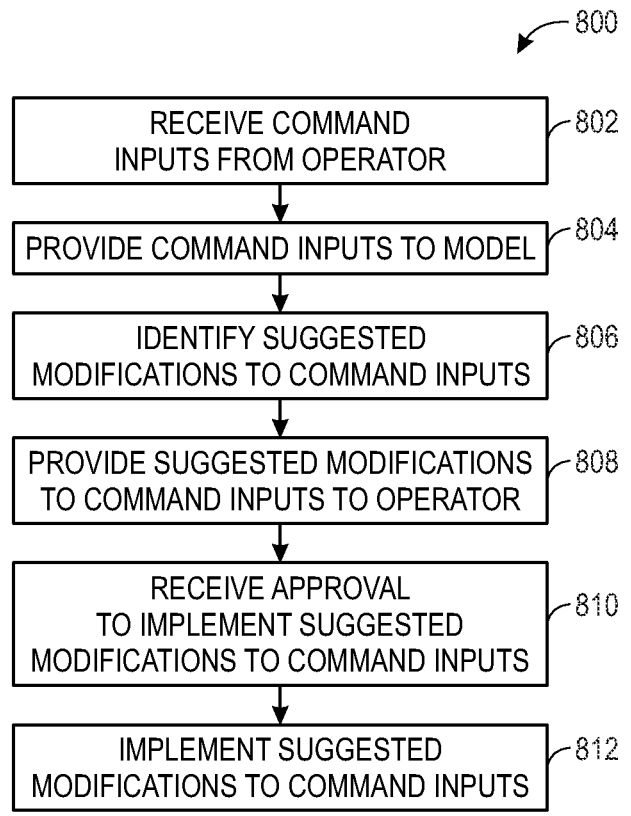
FIG. 9 is a flow chart of a process for receiving and implementing commands for the vehicle using LLM-based AI, in accordance with an embodiment.

FIG. 9 is a flow chart of a process 800 for receiving and implementing commands for a vehicle using LLM-based AI. At block 502, the process 500 receives a command input from the operator. The command may be a vocal command received via a microphone, an input provided via a user interface (e.g., a touchscreen, a keyboard, a button, a joystick, a lever, etc.), a gesture (e.g., captured by an imaging system, a wearable sensor, etc.), some other form, or a combination thereof. The command may be a command to adjust an aspect of the operation of the vehicle. For example, the command may be to speed up, slow down, travel at a specific speed, come to a stop, start moving in a direction, engage an implement, disengage an implement, increase the speed of the implement, decrease the speed of the implement, change gears, change directions, engage the clutch, disengage the clutch, adjust one or more hydraulic systems, engage the PTO, disengage the PTO, adjust a position of the hitch, adjust gauges or indicators in the cab, change information displayed by gauges or indicators in the cab, adjust climate controls in the cab, retrieve information from a product manual, diagnose a condition, provide more information about fault codes, error messages, or alerts, recommend remedial actions to address a condition, recommend modifications to operating parameters, provide maintenance/service information, dim or increase lighting inside and/or outside of the cab, adjust cab tint, adjust seating position, provide recall notice information, etc.

At block 804, the process 800 may provide the command to one or more models (e.g., predictive model, such as a data driven failure mode model, a vehicle function model, etc.) to determine the effect of implementing the command. For example, inputting the command to the one or more models may help to determine, if the command were actually implemented, whether implementing the command would result in one or more operational parameters being within recommended windows, determining whether implementing the command would cause one or more operating parameters to exceed or drop below one or more threshold values, or whether implementing the command would result in inadvisable operating conditions, etc.

At block 806, the process 800 may identify one or more suggested modifications to the command input. For example, inputting the command to the one or more models may result in a determination that implementing the command would be inadvisable and put the vehicle, one or more components of the vehicle, an implement, or one or more components of the implement at increased risk of failure, would put excessive wear on one or more components of the vehicle, or one or more components of an implement, or otherwise result in operation of the vehicle or implement outside of recommended ranges. In some embodiments, the models may also consider data collected from the vehicle, such as current operational parameters, sensed/measured data, etc. Accordingly, the one or more suggested modifications to the command input may include adjustments to one or more operational parameters, adjustments to one or more settings, adjustments to the order or sequencing of one or more actions, waiting to perform an action until another action is completed, not performing an action, suggesting performance of a different action, and so forth.

At block 808, the process 800 may provide the one or more suggested modifications to the command input to the operator. For example, the process 800 may warn the operator that the command may result in undesirable operating conditions, such as inadvisable speeds, running the risk of overheating, causing excessive wear, etc. In such embodiments, the process 800 may suggest the one or more modifications to the command input, which the operator may accept or reject (block 810). The feedback may be provided via a screen of the user interface, in which the operator may be presented with one or more options. In other embodiments, the feedback may be provided via an audio message played over a speaker.

At block 810, the process 800 may receive an acceptance or rejection of the suggested modifications to the command input. If the analysis of the originally received command determines that the command meets certain guidelines and/or criteria (e.g., is reasonable) and no modifications to the input are suggested, blocks 806 and 808 may be omitted.

At block 812, the command is implemented. As previously described, implementing the command may include, for example, generating a command message and transmitting the command message across a CAN network to one or more nodes associated with one or more respective vehicle systems. The command may be implemented by actuating one or more actuators, collecting data from one or more sensors, adjusting one or more operating parameters, and so forth. In some embodiments, the process 800 may take an action without operator authorization to prevent failure of the vehicle, the implement, or failure of one or more components of the vehicle or implement.

Figure 10:
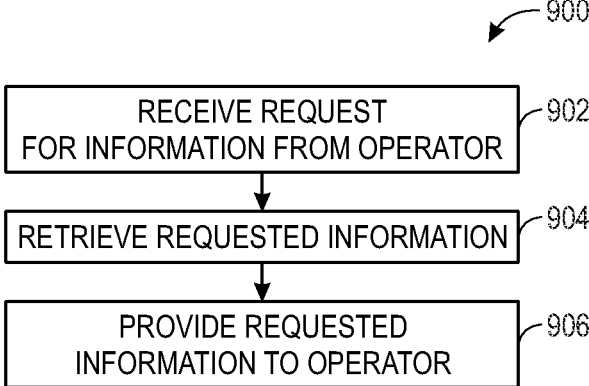
FIG. 10 is a flow chart of a process for retrieving and providing requested information to an operator, in accordance with an embodiment.

FIG. 10 is a flow chart of a process 900 for retrieving and providing requested information to an operator. At block 902, the process 900 receives a request for information from the operator. The request may be received via user inputs and/or a display of a user interface, a vocal request received via a microphone, a gesture detected by an imaging system or wearable sensor, etc. The request may be for information from a product manual, a troubleshooting guide, recommending settings or operating parameters, current settings or operating parameters, current firmware/software versions, if new software/firmware is available, a recommended order for performing tasks, maintenance/service records, when maintenance/service should be performed, an analysis of current operating parameters, recommended operating parameters for performing a task, recommendations for improving efficiency, recommendations for improving performance, and so forth.

At block 904, the requested information may be retrieved from the relevant data source. For example, data may be retrieved from one or more product manuals, one or more databases, one or more models (e.g., a predictive model, such as a data driven failure mode model, a vehicle function model, etc.).

At block 906, the requested information is provided to the operator. The requested information may be provided to the operator via a display of the operator interface of the vehicle, via a speaker in the cab of the vehicle (e.g., mounted to an interior of the cab or as part of a headset worn by the operator), a virtual reality or augmented reality headset worn by the operator, and so forth. In some embodiments, the operator may request additional information, in which case the process 900 may return to block 902, receiving the request, retrieving the requested information (block 904), and providing the requested information to the operator (block 906).

Figure 11:
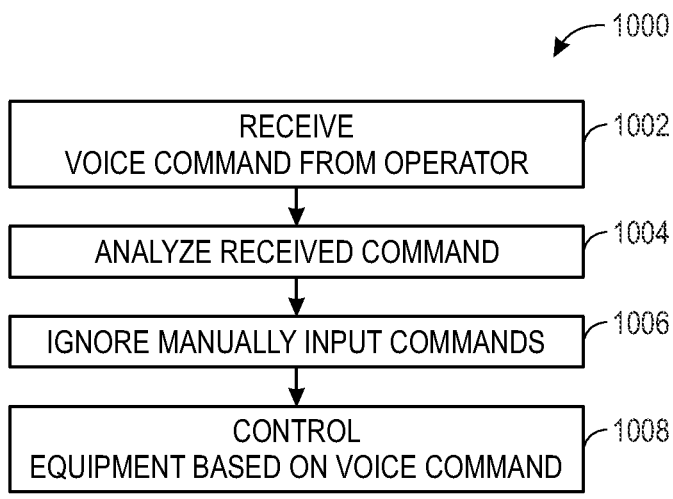
FIG. 11 is a flow chart of a process for receiving a voice command from the operator and controlling equipment based on the voice command using LLM-based AI, in accordance with an embodiment.

FIG. 11 is a flow chart of a process 1000 for receiving a voice command from the operator and controlling equipment based on the voice command using LLM-based AI. At block 1002, the process 1000 receives a voice command from the operator. The voice command may be received via a microphone, mounted inside the cab of the vehicle as part of a headset worn by the operator, or otherwise disposed within the cab of the vehicle. The voice command may be a command to adjust an aspect of the operation of the vehicle. For example, the command may be to speed up, slow down, travel at a specific speed, come to a stop, start moving in a direction, engage an implement, disengage an implement, increase the speed of the implement, decrease the speed of the implement, change gears, change directions, engage the clutch, disengage the clutch, adjust one or more hydraulic systems, engage the PTO, disengage the PTO, adjust a position of the hitch, adjust gauges or indicators in the cab, change information displayed by gauges or indicators in the cab, adjust climate controls in the cab, retrieve information from a product manual, diagnose a condition, provide more information about fault codes, error messages, or alerts, recommend remedial actions to address a condition, recommend modifications to operating parameters, provide maintenance/service information, etc.

At block 1004, the process 500 may analyze the voice command to determine whether the command meets certain guidelines and/or criteria. The analysis may include, for example, modeling the performance of the vehicle (e.g., via the predictive models, the vehicle function models, etc.) if the voice command were actually implemented, determining whether implementing the voice command would keep one or more operational parameters in recommended windows, determining whether implementing the voice command would cause one or more operating parameters to exceed or drop below one or more threshold values, or whether implementing the voice command would result in inadvisable operating conditions, etc.

At block 1006, the process 1000 may ignore one or more previously input commands. For example, the process 1000 may identify any previous commands that conflict with the voice command and ignore any of the conflicting previous commands.

At block 1008, the process may control the equipment based on the voice command. Controlling the equipment based on the voice command may include, for example, generating a command message and transmitting the command message across a CAN network to one or more nodes associated with one or more respective vehicle systems. The command may be implemented by actuating one or more actuators, collecting data from one or more sensors, adjusting one or more operating parameters, and so forth.

Figure 12:
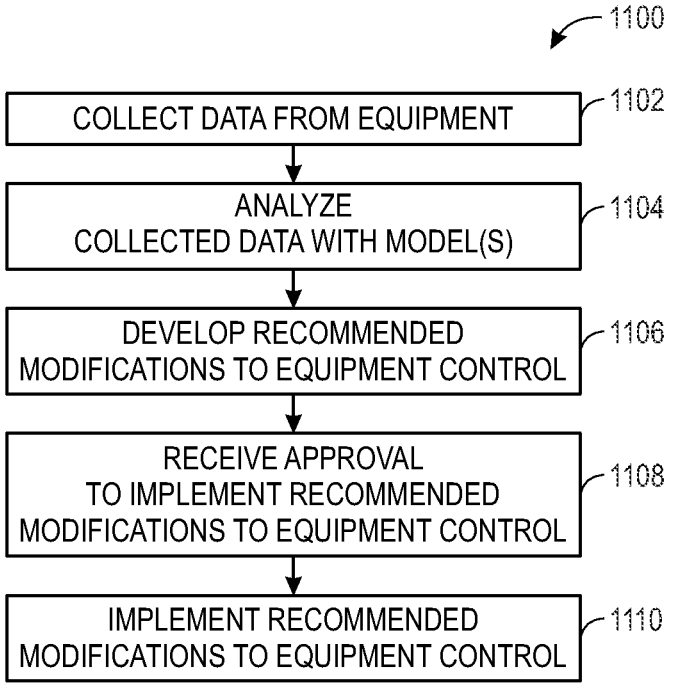
FIG. 12 is a flow chart of a process for developing and implementing recommended modifications to equipment control using LLM-based AI, in accordance with an embodiment.

FIG. 12 is a flow chart of a process 1100 for developing and implementing recommended modifications to equipment control using LLM-based AI. At block 1102, data is collected from a piece of equipment (e.g., the vehicle, an implement, etc.). The data may include, for example, sensed data measured be sensors, operational parameters, settings, set points, thresholds, position data, speed data, fault codes, alarm data, alert data, and so forth.

At block 1104, the collected data may be analyzed using one or more models to determine whether collected data meets certain guidelines and/or criteria. For example, the collected data may be provided to one or more models to model the performance of the equipment (e.g., via the predictive models, the vehicle function models, etc.) based on how the equipment is currently configured. The one or models may help to determine whether current operation of the equipment would keep one or more operational parameters in recommended windows, determining whether current operation of the equipment would cause one or more operating parameters to exceed or drop below one or more threshold values, or whether current operation of the equipment results in inadvisable operating conditions, etc.

At block 1106, the process 1100 develops recommended modifications to the equipment control. For example, providing the collected data to the one or more models may result in a determination that the way the equipment is currently operating could put the equipment (e.g., the vehicle or an implement), or one or more components of the vehicle or an implement at increased risk of failure, would put excessive wear on the equipment or one or more components of the equipment, or otherwise result in operation of the equipment outside of recommended ranges. Accordingly, the one or more suggested modifications to the equipment control may include adjustments to one or more operational parameters, adjustments to one or more settings, adjustments to the order or sequencing of one or more actions, waiting to perform an action until another action is completed, not performing an action, suggesting performance of a different action, and so forth. The recommended modifications to the equipment control may be provided to an operator via the user interface, a speaker inside the cab, a headset worn by the operator, and so forth.

At block 1108, approval is received to implement the recommended modifications to the equipment control. Approval may be received via the user interface (e.g., selection of a button or touchscreen), voice approval, as captured by a microphone in the cab of the vehicle, a gesture, such as a head nod, a thumbs up, etc., as captured by a camera, imaging system, or wearable sensor inside the cab on the vehicle.

At block 1110, the recommended modifications to the equipment control are implemented. Implementing recommended modifications to the equipment control may include, for example, generating a command message and transmitting the command message across a CAN network to one or more nodes associated with one or more respective vehicle systems. The command may be implemented by actuating one or more actuators, collecting data from one or more sensors, adjusting one or more operating parameters, and so forth. In some embodiments, the process 800 may take an action without operator authorization to prevent failure of the vehicle, the implement, or failure of one or more components of the vehicle or implement.

The present disclosure is directed to a large language model (LLM)-based artificial intelligence (AI) system for use in a work vehicle, such as a tractor. The vehicle may include an operator interface, one or more vehicle systems (e.g., a throttle system, a braking system, a transmission system, a clutch system, a steering system, a hydraulics system, a power take off (PTO) system, a hitch system, gauges/indicators, lights/wipers, cab climate control, etc.), and an electronic control unit (ECU). The ECU may include processing circuitry and a memory. The memory may store an LLM and program instructions executable by the processing circuitry to perform various functions. For example, the ECU may be configured to receive inputs (e.g., voice commands, inputs via a touchscreen, buttons, keyboard, gesture commands, etc.) from an operator interface, analyze the inputs using the LLM, confirm that the inputs meet a set of criteria, and then transmit commands to the one or more vehicle systems to implement the inputs. In some embodiments the vehicle may include a CAN bus network or a LIN bus network that communicatively couple the ECU and the various vehicle systems and by which commands and data may be transmitted. In some embodiments, the LLM may suggest one or more modifications to the inputs, which may be presented to the operator for approval. The ECU may also be configured to collect data from one or more of the vehicle systems during operation, analyze the data via the LLM, generate one or more suggested modifications to the operation of the work vehicle, transmit the one or more modifications for presentation via the operator interface, receive approval of the one or more modifications, and transmit commands to one or more of the vehicle systems implementing the one or more suggested modifications. The LLM may be trained on various data, such as predictive models, vehicle manuals, vehicle function models, and the like.

Accordingly, the LLM may be configured to receive requests for portions of one or more manuals, summaries of error codes, and the like, retrieve the data, and provide it to the operator via the operator interface. The LLM may be trained by a third party, such as a manufacturer of the vehicle, a manufacturer of an implement or tool, a distributor of the vehicle, a service provider, and the like and then installed on the ECU for use by the operator. If the third party wishes to update the LLM, the third party may provide updates via a dealer (e.g., when the vehicle is in for service), via a tethered mobile device, via a docking station, via the internet or a connected cloud, via cellular network, via internet connection, via satellite connection, and so forth.

Technical effects of implementing the disclosed techniques may include, for example, operation of the vehicle being less physically and mentally taxing for an operator, resulting in reduced operator fatigue, allowing operators to improve performance and work longer hours without fatigue, thus reducing the number of operators needed to achieve a set level of productivity. Use of the disclosed techniques may also improve operator performance and efficiency, resulting in safer and more productive operation of vehicles, reduced fuel consumption, lower operating costs, and so forth. Further, the disclosed techniques may result in early detection of issues and/or operating practices that may cause increased wear and or increase the risk of failure, resulting in longer lifespans for equipment, less downtime, and longer maintenance schedules. Use of the disclosed techniques may also improve the customer experience with products, resulting in happier customers, more brand loyalty among customers, improved brand reputation, increased sales, and so forth.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An electronic control unit (ECU) for a work vehicle, wherein the ECU is configured to be communicatively coupled to an operator interface of the work vehicle and to one or more vehicle systems of the work vehicle, wherein the ECU comprises:
   processing circuitry; and
   a memory, accessible by the processing circuitry, the memory storing:
   a large language model (LLM); and
   instructions that, when executed by the processing circuitry, causes the processing circuitry to perform operations comprising:
   receiving data from the one or more vehicle systems during operation of the work vehicle;
   providing the received data to the LLM;
   receiving, from the LLM, one or more suggested modifications to the operation of the work vehicle;
   transmitting, to the operator interface, the one or more suggested modifications to the operation of the work vehicle;

receiving, from the operator interface, approval of the one or more suggested modifications to the operation of the work vehicle; and transmitting one or more commands to the one or more vehicle systems to implement the one or more suggested modifications to the operation of the work vehicle.

2. The ECU of claim 1, wherein the LLM is configured to generate the one or more suggested modifications to the operation of the work vehicle by referencing one or more predictive models, one or more vehicle manuals, one or more vehicle function models, or any combination thereof.

3. The ECU of claim 1, wherein the approval of the one or more suggested modifications to the operation of the work vehicle is provided via voice command.

4. The ECU of claim 1, wherein the approval of the one or more suggested modifications to the operation of the work vehicle is provided via a user interface.

5. The ECU of claim 1, wherein the approval of the one or more suggested modifications to the operation of the work vehicle is provided via a gesture.

6. The ECU of claim 1, wherein the operations comprise:

receiving a request for more information about the one or more suggested modifications to the operation of the work vehicle;

providing the request to the LLM;

receiving, from the LLM, the more information about the one or more suggested modifications to the operation of the work vehicle; and providing, to the operator interface, the more information about the one or more suggested modifications to the operation of the work vehicle.

7. The ECU of claim 1, wherein the data from the one or more vehicle systems comprises one or more fault codes, wherein the operations comprise:

providing, to the LLM, a request for summaries of the one or more fault codes;

receiving, from the LLM the summaries of the one or more fault codes; and providing, to the operator interface, the summaries of the one or more fault codes.

8. The ECU of claim 1, wherein the one or more vehicle systems of the work vehicle comprise a throttle system, a braking system, a transmission system, a clutch system, a steering system, a hydraulics system, a power take off (PTO) system, a hitch system, or a combination thereof.

9. The ECU of claim 1, wherein transmitting the one or more commands to the one or more vehicle systems to implement the one or more suggested modifications to the operation of the work vehicle comprises transmitting commands via a CAN bus network or a LIN bus network of the work vehicle.

10. A method, comprising:

receiving data from one or more vehicle systems of a work vehicle during operation of the work vehicle;

providing the received data to a large language model (LLM);

receiving, from the LLM, one or more suggested modifications to the operation of the work vehicle;

transmitting, to an operator interface, the one or more suggested modifications to the operation of the work vehicle;

receiving, from the operator interface, approval of the one or more suggested modifications to the operation of the work vehicle; and transmitting one or more commands to the one or more vehicle systems to implement the one or more suggested modifications to the operation of the work vehicle.

11. The method of claim 10, wherein the approval of the one or more suggested modifications to the operation of the work vehicle is provided via voice command, a gesture, a user interface, or any combination thereof.

12. The method of claim 10, comprising:

receiving a request for more information about the one or more suggested modifications to the operation of the work vehicle;

providing the request to the LLM;

receiving, from the LLM, the more information about the one or more suggested modifications to the operation of the work vehicle; and providing, to the operator interface, the more information about the one or more suggested modifications to the operation of the work vehicle.

13. The method of claim 10, wherein the data from the one or more vehicle systems comprises one or more fault codes, wherein the method comprises:

providing, to the LLM, a request for summaries of the one or more fault codes;

receiving, from the LLM the summaries of the one or more fault codes; and providing, to the operator interface, the summaries of the one or more fault codes.

14. The method of claim 10, wherein the one or more vehicle systems of the work vehicle comprise a throttle system, a braking system, a transmission system, a clutch system, a steering system, a hydraulics system, a power take off (PTO) system, a hitch system, or a combination thereof.

15. The method of claim 10, wherein transmitting the one or more commands to the one or more vehicle systems to implement the one or more suggested modifications to the operation of the work vehicle comprises transmitting commands via a CAN bus network or a LIN bus network of the work vehicle.

16. A tangible, non-transitory, computer-readable medium storing instructions that, when executed by processing circuitry, causes the processing circuitry to perform operations comprising:

receiving data from one or more vehicle systems of a work vehicle during operation of the work vehicle;

providing the received data to a large language model (LLM);

receiving, from the LLM, one or more suggested modifications to the operation of the work vehicle;

transmitting, to an operator interface, the one or more suggested modifications to the operation of the work vehicle;

receiving, from the operator interface, approval of the one or more suggested modifications to the operation of the work vehicle; and transmitting one or more commands to the one or more vehicle systems to implement the one or more suggested modifications to the operation of the work vehicle.

17. The computer-readable medium of claim 16, wherein the LLM is configured to generate the one or more suggested modifications to the operation of the work vehicle by referencing one or more predictive models, one or more vehicle manuals, one or more vehicle function models, or any combination thereof.

18. The computer-readable medium of claim 16, wherein the approval of the one or more suggested modifications to the operation of the work vehicle is provided via voice command, a gesture, a user interface, or any combination thereof.

19. The computer-readable medium of claim 16, wherein the operations comprise:

receiving a request for more information about the one or more suggested modifications to the operation of the work vehicle;

providing the request to the LLM;

receiving, from the LLM, the more information about the one or more suggested modifications to the operation of the work vehicle; and providing, to the operator interface, the more information about the one or more suggested modifications to the operation of the work vehicle.

20. The computer-readable medium of claim 16, wherein the data from the one or more vehicle systems comprises one or more fault codes, wherein the operations comprise:

providing, to the LLM, a request for summaries of the one or more fault codes;

receiving, from the LLM the summaries of the one or more fault codes; and providing, to the operator interface, the summaries of the one or more fault codes.

\* \* \* \* \*